United States Patent
Nelluri et al.

(10) Patent No.: US 12,013,927 B2
(45) Date of Patent: Jun. 18, 2024

(54) SYSTEM AND METHOD FOR GENERATING AND MONITORING DYNAMIC IDENTIFIERS FOR DATA PROCESSING SECURITY

(71) Applicant: BANK OF AMERICA CORPORATION, Charlotte, NC (US)

(72) Inventors: Govinda Rajulu Nelluri, Hyderabad (IN); Srinivasa Rao Dakshinyam, Hyderabad (IN); Meenakshi MeenakshiSundaram, Chennai (IN); Nithya C, Chennai (IN)

(73) Assignee: BANK OF AMERICA CORPORATION, Charlotte, NC (US)

( * ) Notice: Subject to any disclaimer, the term of this patent is extended or adjusted under 35 U.S.C. 154(b) by 321 days.

(21) Appl. No.: 17/701,793

(22) Filed: Mar. 23, 2022

(65) Prior Publication Data
US 2023/0306105 A1 Sep. 28, 2023

(51) Int. Cl.
*G06F 21/45* (2013.01)
*H04L 9/40* (2022.01)

(52) U.S. Cl.
CPC ............ *G06F 21/45* (2013.01); *H04L 63/123* (2013.01)

(58) Field of Classification Search
CPC ..... G06F 21/45; H04L 63/123; H04L 9/0822; H04L 63/18; H04L 47/801
See application file for complete search history.

(56) References Cited

U.S. PATENT DOCUMENTS

| | | | |
|---|---|---|---|
| 8,516,560 B2* | 8/2013 | Sheets | G06Q 20/3825 713/176 |
| 9,444,620 B1* | 9/2016 | Murphy | H04L 63/0876 |
| 11,380,331 B1 | 7/2022 | Leong | |
| 11,429,949 B1 | 8/2022 | Oakes, III | |
| 11,430,029 B1 | 8/2022 | Sutaria | |
| 11,443,579 B2 | 9/2022 | Outwater | |
| 11,455,537 B2 | 9/2022 | Katz | |
| 11,475,044 B2 | 10/2022 | Cruanes | |
| 2021/0180986 A1* | 6/2021 | Alavi | G01C 21/3856 |
| 2022/0261469 A1 | 8/2022 | Kalous | |
| 2022/0292088 A1 | 9/2022 | Beausoleil | |
| 2022/0300956 A1 | 9/2022 | Gonzales, Jr. | |

(Continued)

*Primary Examiner* — Shanto Abedin
(74) *Attorney, Agent, or Firm* — Moore & Van Allen PLLC; Nicholas C. Russell

(57) ABSTRACT

Various systems, methods, and computer program products are provided for generating and monitoring dynamic identifiers for data processing security. The method includes generating a dynamic identifier for a user request. The dynamic identifier changes based on a receiving node of the dynamic identifier. The method also includes updating the dynamic identifier in an instance in which the user request is transmitted from a first node to a second node. The method further includes generating a dynamic identifier change log. The dynamic identifier change log includes at least one historical dynamic identifier from a previous receiving node. The method still further includes determining whether the dynamic identifier change log matches an expected dynamic identifier change log. The method also includes causing a transmission of a dynamic identifier verification upon determining that the dynamic identifier change log matches the expected dynamic identifier change log.

20 Claims, 6 Drawing Sheets

(56) References Cited

U.S. PATENT DOCUMENTS

| | | |
|---|---|---|
| 2022/0303274 A1 | 9/2022 | Cernoch |
| 2022/0303993 A1 | 9/2022 | Adachi |
| 2022/0311742 A1 | 9/2022 | Zuk |
| 2022/0326690 A1 | 10/2022 | Cella |
| 2022/0327552 A1 | 10/2022 | Gong |
| 2022/0337612 A1 | 10/2022 | Beck |
| 2022/0338270 A1 | 10/2022 | Deng |
| 2022/0343324 A1 | 10/2022 | Ozvat |
| 2022/0343341 A1* | 10/2022 | Dai Zovi .............. G07F 7/0873 |
| 2022/0345451 A1 | 10/2022 | Hitchcock |

* cited by examiner

SYSTEM AND METHOD FOR GENERATING AND MONITORING DYNAMIC IDENTIFIERS FOR DATA PROCESSING SECURITY

TECHNOLOGICAL FIELD

An example embodiment relates generally to data processing security, and more particularly, to dynamically monitoring data processing security.

BACKGROUND

Data transfers often have multiple entities receiving and transmitting data, which can cause issues with data verification. It can be difficult to know whether a seemingly legitimate request is from a secure source. Currently, there are no authentication that can be performed on data requests in or near real-time creating potential security issues and/or delayed data processing. There exists a need for a system that can provide data verification and authentication during data processing.

BRIEF SUMMARY

The following presents a summary of certain embodiments of the disclosure. This summary is not intended to identify key or critical elements of all embodiments nor delineate the scope of any or all embodiments. Its sole purpose is to present certain concepts and elements of one or more embodiments in a summary form as a prelude to the more detailed description that follows.

In an example embodiment, a system for generating and monitoring a dynamic identifier for data processing security is provided. The system includes at least one non-transitory storage device and at least one processing device coupled to the at least one non-transitory storage device. The at least one processing device is configured to generate a dynamic identifier for a user request in an instance in which a user initiates the user request. The user request is configured to be transmitted to a plurality of nodes and the dynamic identifier changes based on a receiving node of the dynamic identifier. The at least one processing device is also configured to update the dynamic identifier in an instance in which the user request is transmitted from a first node to a second node. The at least one processing device is further configured to generate a dynamic identifier change log. The dynamic identifier change log includes at least one historical dynamic identifier from a previous receiving node. The at least one processing device is still further configured to determine whether the dynamic identifier change log matches an expected dynamic identifier change log. The at least one processing device is also configured to cause a transmission of a dynamic identifier verification upon determining that the dynamic identifier change log matches the expected dynamic identifier change log.

In some embodiments, the dynamic identifier is a hash dubcode generated for identifying one or more nodes that receive or transmit the user request. In some embodiments, determining whether the dynamic identifier change log matches the expected dynamic identifier change log includes determining whether a dynamic identifier timeline of the dynamic identifier change log matches an expected dynamic identifier timeline of the expected dynamic identifier change log.

In some embodiments, determining whether the dynamic identifier change log matches the expected dynamic identifier change log includes determining whether at least one of the dynamic identifier or at least one of the at least one historical dynamic identifier matches an expected dynamic identifier. In some embodiments, the dynamic identifier is used to reference user information that is stored with the receiving node.

In some embodiments, each of the first node and the second node are in communication with a dynamic identifier generation engine configured to generate the dynamic identifier and update the dynamic identifier. In some embodiments, the dynamic identifier is updated a plurality of times before the user request is approved or rejected.

In another example embodiment, a computer program product for generating and monitoring a dynamic identifier for data processing security is provided. The computer program product includes at least one non-transitory computer-readable medium having computer-readable program code portions embodied therein. The computer-readable program code portions include an executable portion configured to generate a dynamic identifier for a user request in an instance in which a user initiates the user request. The user request is configured to be transmitted to a plurality of nodes and the dynamic identifier changes based on a receiving node of the dynamic identifier. The computer-readable program code portions also include an executable portion configured to update the dynamic identifier in an instance in which the user request is transmitted from a first node to a second node. The computer-readable program code portions further include an executable portion configured to generate a dynamic identifier change log. The dynamic identifier change log includes at least one historical dynamic identifier from a previous receiving node. The computer-readable program code portions still further include an executable portion configured to determine whether the dynamic identifier change log matches an expected dynamic identifier change log. The computer-readable program code portions also include an executable portion configured to cause a transmission of a dynamic identifier verification upon determining that the dynamic identifier change log matches the expected dynamic identifier change log.

In some embodiments, the dynamic identifier is a hash dubcode generated for identifying one or more nodes that receive or transmit the user request. In some embodiments, determining whether the dynamic identifier change log matches the expected dynamic identifier change log includes determining whether a dynamic identifier timeline of the dynamic identifier change log matches an expected dynamic identifier timeline of the expected dynamic identifier change log.

In some embodiments, determining whether the dynamic identifier change log matches the expected dynamic identifier change log includes determining whether at least one of the dynamic identifier or at least one of the at least one historical dynamic identifier matches an expected dynamic identifier. In some embodiments, the dynamic identifier is used to reference user information that is stored with the receiving node.

In some embodiments, each of the first node and the second node are in communication with a dynamic identifier generation engine configured to generate the dynamic identifier and update the dynamic identifier. In some embodiments, the dynamic identifier is updated a plurality of times before the user request is approved or rejected.

In still another example embodiment, a computer-implemented method for generating and monitoring a dynamic identifier for data processing security is provided. The method includes generating a dynamic identifier for a user request in an instance in which a user initiates the user request. The user request is configured to be transmitted to a plurality of nodes and the dynamic identifier changes based on a receiving node of the dynamic identifier. The method also includes updating the dynamic identifier in an instance in which the user request is transmitted from a first node to a second node. The method further includes generating a dynamic identifier change log. The dynamic identifier change log includes at least one historical dynamic identifier from a previous receiving node. The method still further includes determining whether the dynamic identifier change log matches an expected dynamic identifier change log. The method also includes causing a transmission of a dynamic identifier verification upon determining that the dynamic identifier change log matches the expected dynamic identifier change log.

In some embodiments, the dynamic identifier is a hash dubcode generated for identifying one or more nodes that receive or transmit the user request. In some embodiments, determining whether the dynamic identifier change log matches the expected dynamic identifier change log includes determining whether a dynamic identifier timeline of the dynamic identifier change log matches an expected dynamic identifier timeline of the expected dynamic identifier change log.

In some embodiments, determining whether the dynamic identifier change log matches the expected dynamic identifier change log includes determining whether at least one of the dynamic identifier or at least one of the at least one historical dynamic identifier matches an expected dynamic identifier. In some embodiments, the dynamic identifier is used to reference user information that is stored with the receiving node.

In some embodiments, each of the first node and the second node are in communication with a dynamic identifier generation engine configured to generate the dynamic identifier and update the dynamic identifier. In some embodiments, the dynamic identifier is updated a plurality of times before the user request is approved or rejected.

Embodiments of the present disclosure address the above needs and/or achieve other advantages by providing apparatuses (e.g., a system, computer program product and/or other devices) and methods for generating and monitoring dynamic identifiers for data processing security. The system embodiments may comprise one or more memory devices having computer readable program code stored thereon, a communication device, and one or more processing devices operatively coupled to the one or more memory devices, wherein the one or more processing devices are configured to execute the computer readable program code to carry out said embodiments. In computer program product embodiments of the disclosure, the computer program product comprises at least one non-transitory computer readable medium comprising computer readable instructions for carrying out said embodiments. Computer implemented method embodiments of the disclosure may comprise providing a computing system comprising a computer processing device and a non-transitory computer readable medium, where the computer readable medium comprises configured computer program instruction code, such that when said instruction code is operated by said computer processing device, said computer processing device performs certain operations to carry out said embodiments.

BRIEF DESCRIPTION OF THE DRAWINGS

Figure 1:
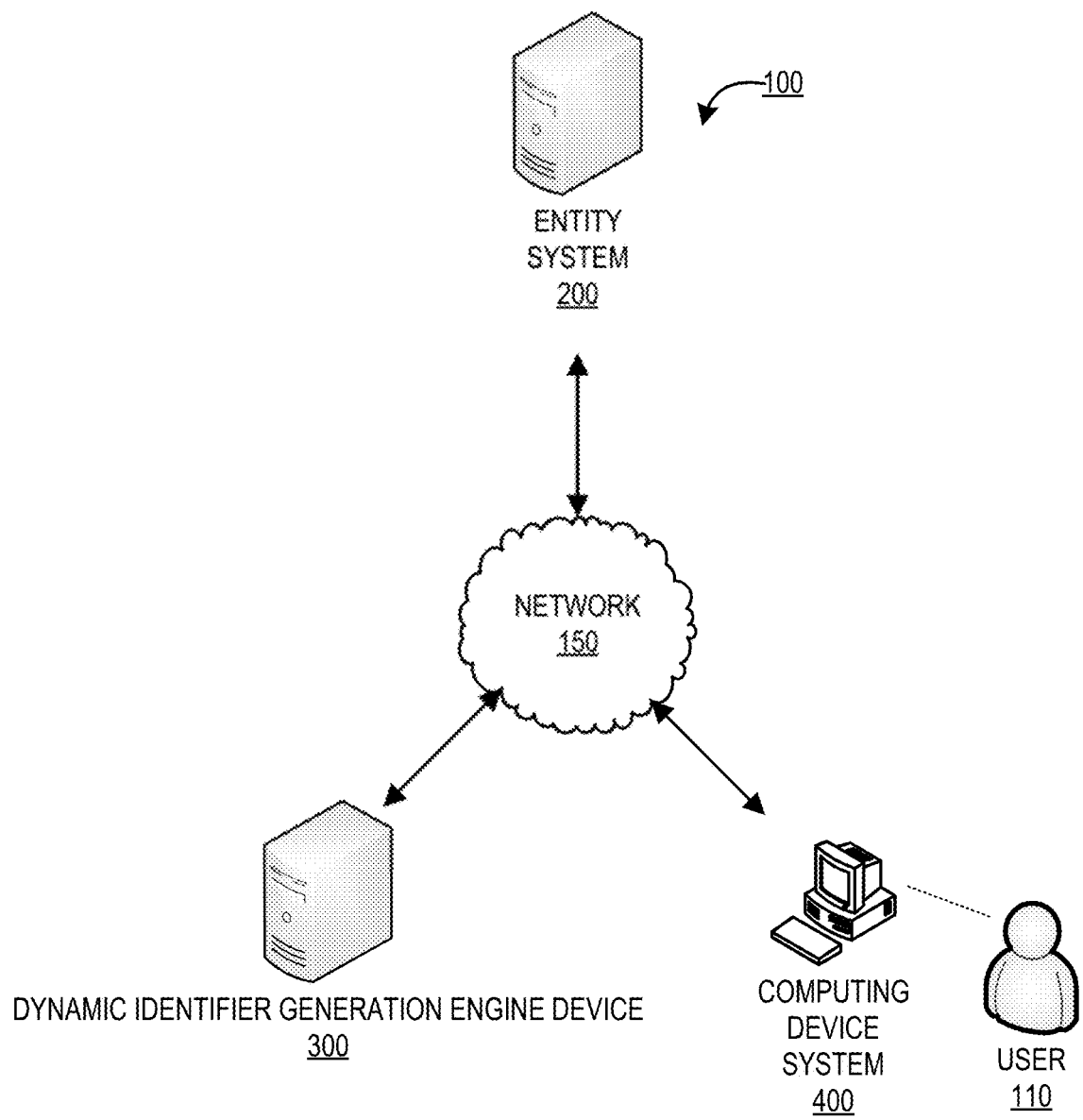
Figure 2:
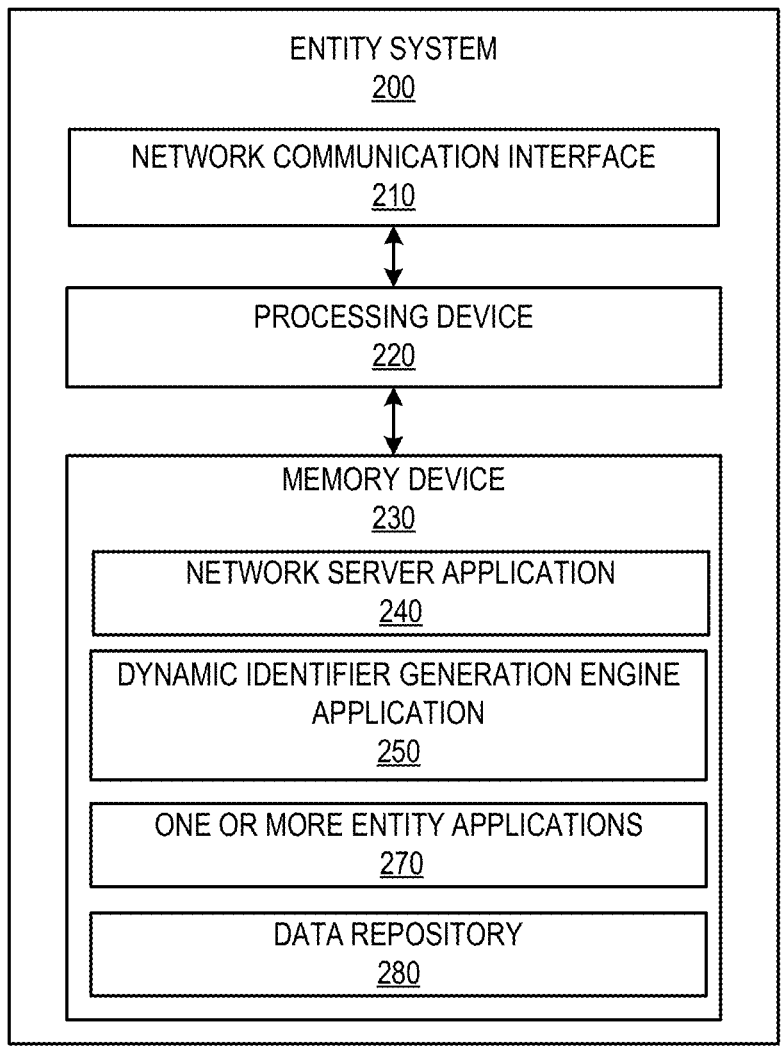
Figure 3:
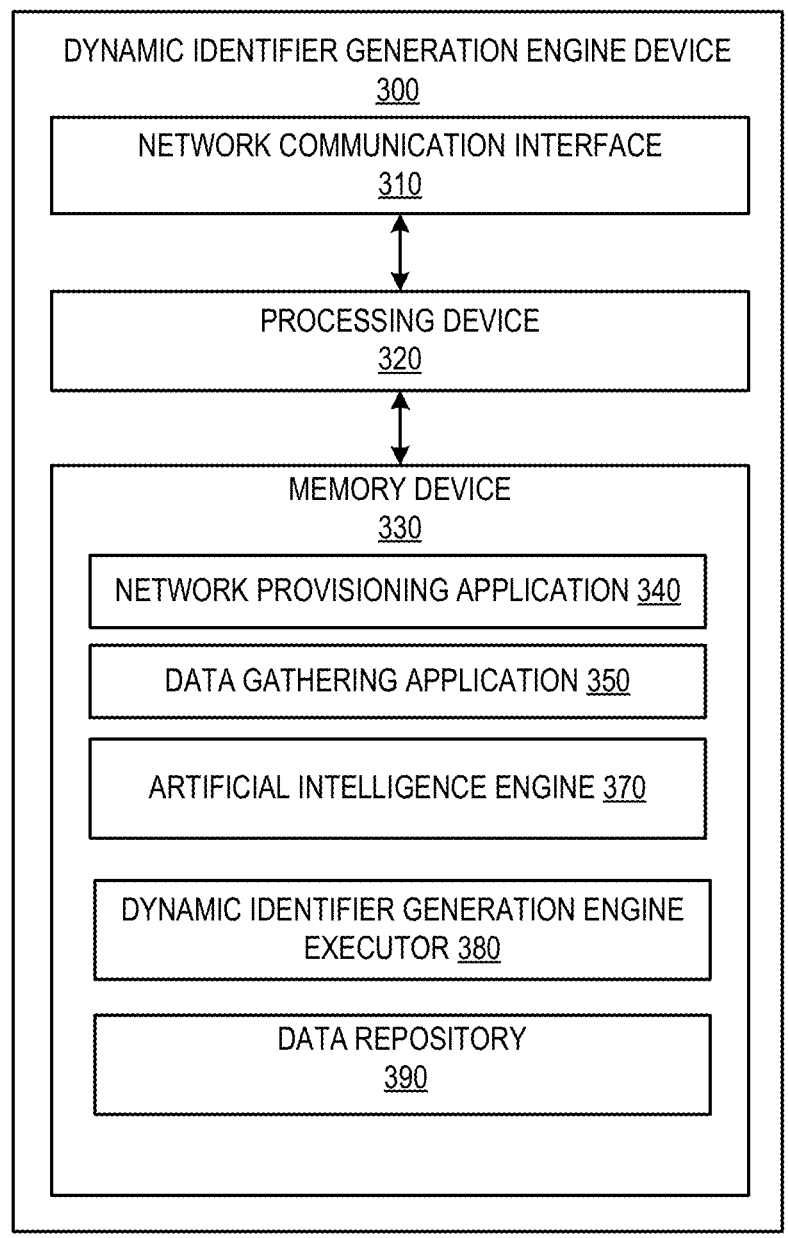
Figure 4:
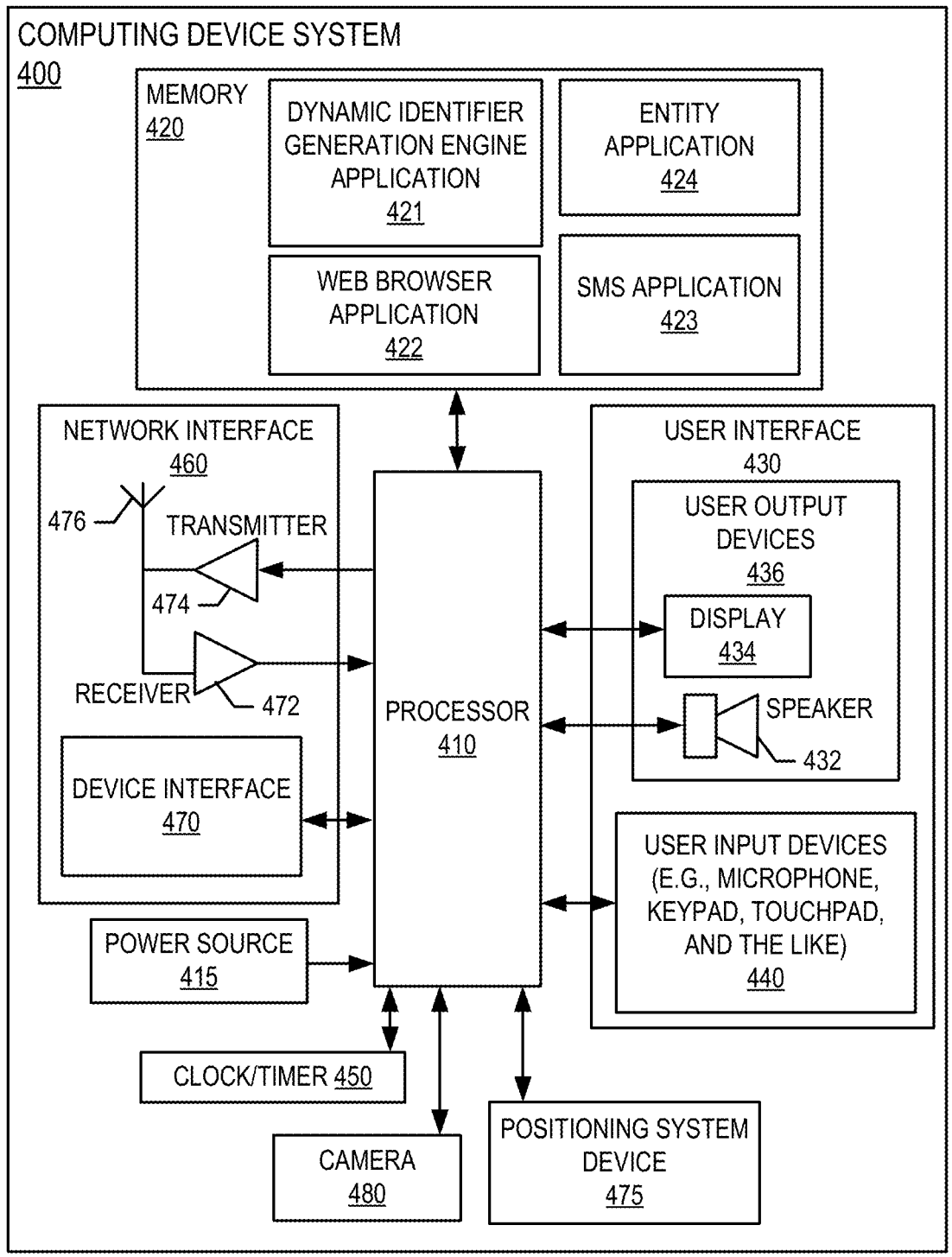
Figure 5:
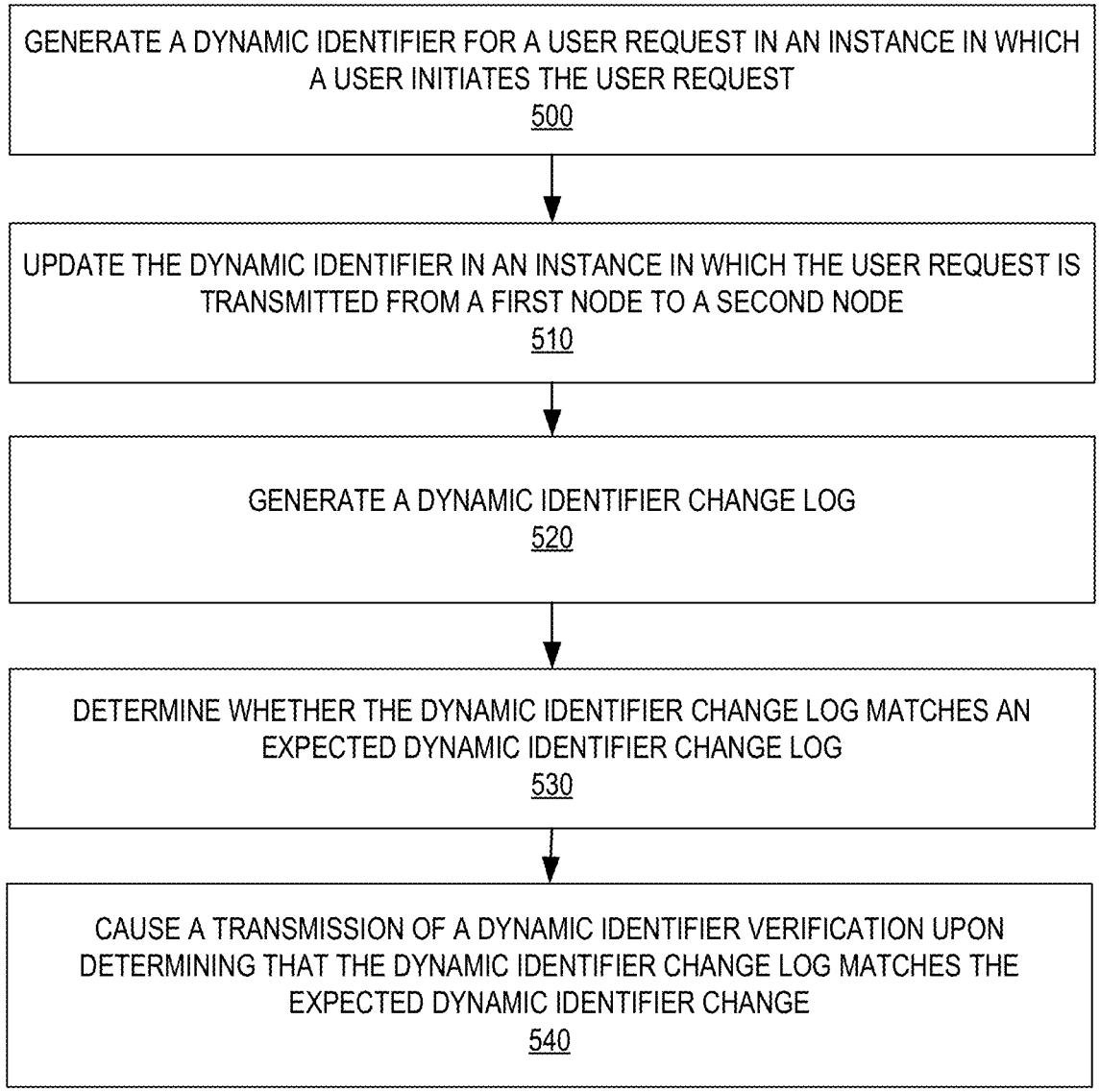
Figure 6:
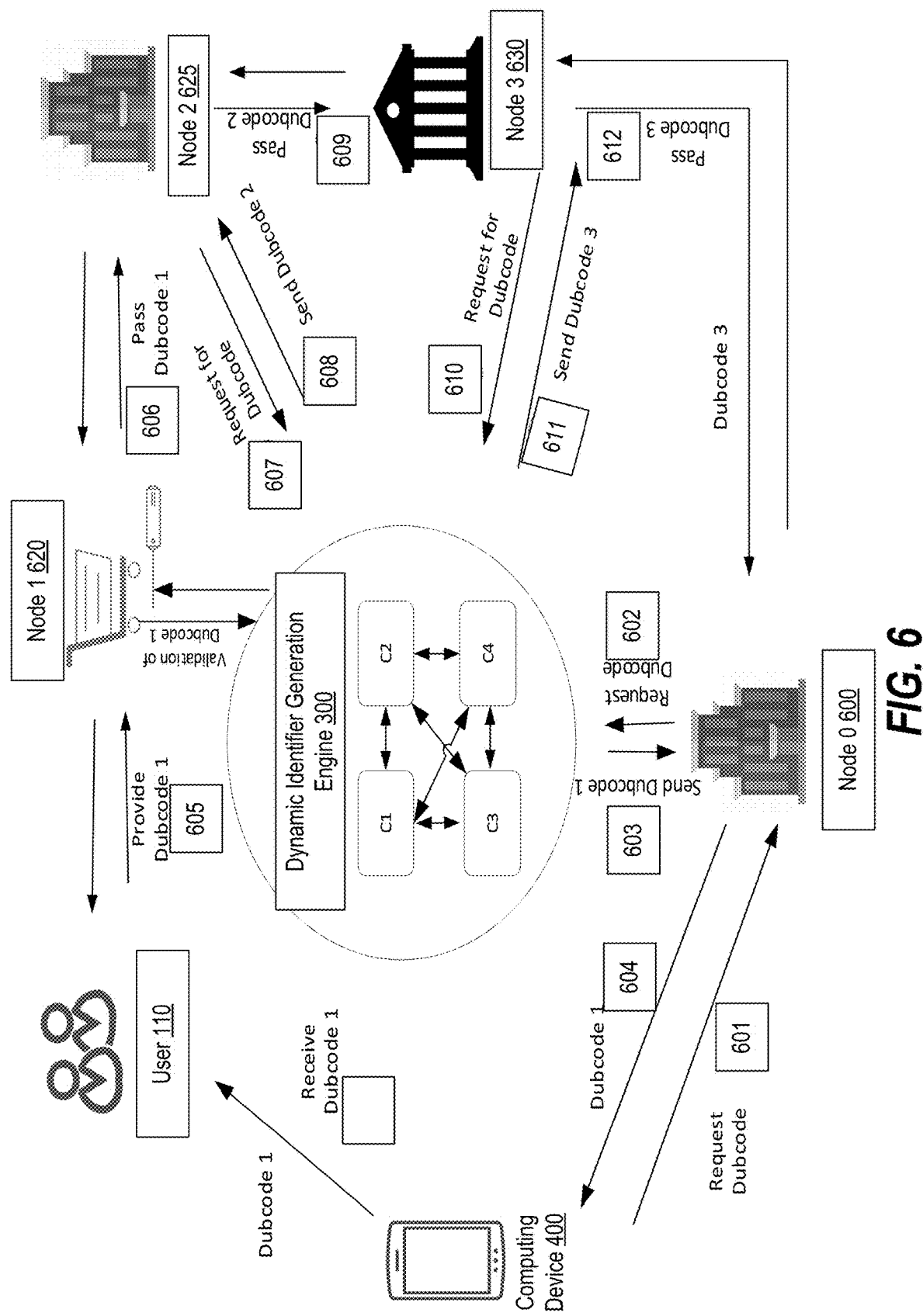

Having thus described embodiments of the disclosure in general terms, reference will now be made the accompanying drawings, wherein:

FIG. 1 provides a block diagram illustrating a system environment for generating and monitoring a dynamic identifier for data processing security, in accordance with embodiments of the present disclosure;

FIG. 2 provides a block diagram illustrating the entity system 200 of FIG. 1, in accordance with embodiments of the present disclosure;

FIG. 3 provides a block diagram illustrating a dynamic identifier generation engine device 300 of FIG. 1, in accordance with embodiments of the present disclosure;

FIG. 4 provides a block diagram illustrating the computing device system 400 of FIG. 1, in accordance with embodiments of the present disclosure;

FIG. 5 illustrates a flow chart of the method of generating and monitoring a dynamic identifier for data processing security in accordance with an embodiment of the present disclosure; and FIG. 6 illustrates a dynamic identifier being transferred and updated across a plurality of nodes in accordance with embodiments of the present disclosure.

DETAILED DESCRIPTION

Embodiments of the present disclosure will now be described more fully hereinafter with reference to the accompanying drawings, in which some, but not all, embodiments of the present disclosure are shown. Indeed, the present disclosure may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As described herein, the term "entity" may be any organization that utilizes one or more entity resources, including, but not limited to, one or more entity systems, one or more entity databases, one or more applications, one or more servers, or the like to perform one or more organization activities associated with the entity. In some embodiments, an entity may be any organization that develops, maintains, utilizes, and/or controls one or more applications and/or databases. Applications as described herein may be any software applications configured to perform one or more operations of the entity. Databases as described herein may be any datastores that store data associated with organizational activities associated with the entity. In some embodiments, the entity may be a financial institution which may include herein may include any financial institutions such as commercial banks, thrifts, federal and state savings banks, savings and loan associations, credit unions, investment companies, insurance companies and the like. In some embodiments, the financial institution may allow a customer to establish an account with the financial institution. In some embodiments, the entity may be a non-financial institution.

Many of the example embodiments and implementations described herein contemplate interactions engaged in by a user with a computing device and/or one or more communication devices and/or secondary communication devices.

A "user", as referenced herein, may refer to an entity or individual that has the ability and/or authorization to access and use one or more applications provided by the entity and/or the system of the present disclosure. Furthermore, as used herein, the term "user computing device" or "mobile device" may refer to mobile phones, computing devices, tablet computers, wearable devices, smart devices and/or any portable electronic device capable of receiving and/or storing data therein.

A "user interface" is any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user or to output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

"Distributed ledger" or "distributed electronic ledger" as used herein may refer to a structured list of data records that is decentralized and distributed amongst a plurality of computing systems and devices. In some embodiments, the distributed ledger may be a blockchain ledger. "Node" as used herein may refer to a computing system on which the distributed ledger is hosted. Each node may maintain a full copy of the distributed ledger or be in communication with a computing system that does maintain a full copy of the distributed ledger.

Data processing needs to be both secure and fast. However, it is often hard to verify data for processing in real-time, which results in less secure and/or slower data processing. Additionally, currently user data often must be transmitted across multiple nodes, which leaves the user data vulnerable. The present disclosure is targeted at increasing data processing security without introducing unnecessary delay. The dynamic identifier of various embodiments may be transmitted in place of user data. For example, the dynamic identifier may be transmitted as a proxy for payment information and therefore reduces the vulnerability of sensitive user data being hacked and/or illegally accessed. Additionally, the dynamic identifier can be verified in near real-time allowing for faster data processing.

Various embodiments of the present disclosure provide a system for generating and monitoring a dynamic identifier for data processing security. The system generates a dynamic identifier relating to a user request. The dynamic identifier can be transmitted to other nodes (e.g., associated with different entities) instead of sending personal user data. The dynamic identifier is altered each time is it transferred to a different node. The changes to the dynamic identifier are stored in a dynamic identifier change log. The dynamic identifier change log may be stored on a blockchain. The dynamic identifier change log allows for the dynamic identifier to be traced (i.e., the nodes in which the dynamic identifier has been transmitted can be determined). The dynamic identifier change log is compared to an expected dynamic identifier change log, to determine whether the dynamic identifier is authentic. Upon determining the dynamic identifier is authentic, an entity related to each node may carry out an operation relating to the user request.

FIG. 1 provides a block diagram illustrating a system environment 100 for generating and monitoring dynamic identifiers for data processing security. As illustrated in FIG. 1, the environment 100 includes a dynamic identifier generation engine device 300, an entity system 200, and a computing device system 400. One or more users 110 may be included in the system environment 100, where the users 110 interact with the other entities of the system environment 100 via a user interface of the computing device system 400. In some embodiments, the one or more user(s) 110 of the system environment 100 may be employees (e.g., application developers, database administrators, application owners, application end users, business analysts, finance agents, or the like) of an entity associated with the entity system 200.

The entity system(s) 200 may be any system owned or otherwise controlled by an entity to support or perform one or more process steps described herein. In some embodiments, the entity is a financial institution. In some embodiments, the entity may be a non-financial institution. In some embodiments, the entity may be any organization that utilizes one or more entity resources to perform one or more organizational activities.

The dynamic identifier generation engine device 300 is a system of the present disclosure for performing one or more process steps described herein. In some embodiments, the dynamic identifier generation engine device 300 may be an independent system. In some embodiments, the dynamic identifier generation engine device 300 may be a part of the entity system 200. For example, the methods discussed herein may be carried out by the entity system 200, the dynamic identifier generation engine device 300, the computing device system 400, and/or a combination thereof.

The dynamic identifier generation engine device 300, the entity system 200, and/or the computing device system 400 may be in network communication across the system environment 100 through the network 150. The network 150 may include a local area network (LAN), a wide area network (WAN), and/or a global area network (GAN). The network 150 may provide for wireline, wireless, or a combination of wireline and wireless communication between devices in the network. In one embodiment, the network 150 includes the Internet. In general, the dynamic identifier generation engine device 300 is configured to communicate information or instructions with the entity system 200, and/or the computing device system 400 across the network 150. While the entity system 200, the dynamic identifier generation engine device 300, and the computing device system 400 are illustrated as separate components communicating via network 150, one or more of the components discussed here may be carried out via the same system (e.g., a single system may include the entity system 200 and the dynamic identifier generation engine device 300).

The computing device system 400 may be a system owned or controlled by the entity of the entity system 200 and/or the user 110. As such, the computing device system 400 may be a computing device of the user 110. In general, the computing device system 400 communicates with the user 110 via a user interface of the computing device system 400, and in turn is configured to communicate information or instructions with the dynamic identifier generation engine device 300, and/or entity system 200 across the network 150.

FIG. 2 provides a block diagram illustrating the entity system 200, in greater detail, in accordance with embodiments of the disclosure. As illustrated in FIG. 2, in one embodiment, the entity system 200 includes one or more processing devices 220 operatively coupled to a network communication interface 210 and a memory device 230. In certain embodiments, the entity system 200 is operated by a first entity, such as a financial institution. In some embodiments, the entity system 200 may be a multi-tenant cluster storage system.

It should be understood that the memory device 230 may include one or more databases or other data structures/repositories. The memory device 230 also includes computer-executable program code that instructs the processing device 220 to operate the network communication interface 210 to perform certain communication functions of the entity system 200 described herein. For example, in one embodiment of the entity system 200, the memory device 230 includes, but is not limited to, a dynamic identifier generation engine application 250, one or more entity applications 270, and a data repository 280 comprising data accessed, retrieved, and/or computed by the entity system 200. The one or more entity applications 270 may be any applications developed, supported, maintained, utilized, and/or controlled by the entity. The computer-executable program code of the network server application 240, the dynamic identifier generation engine application 250, the one or more entity application 270 to perform certain logic, data-extraction, and data-storing functions of the entity system 200 described herein, as well as communication functions of the entity system 200.

The network server application 240, the dynamic identifier generation engine application 250, and the one or more entity applications 270 are configured to store data in the data repository 280 or to use the data stored in the data repository 280 when communicating through the network communication interface 210 with the dynamic identifier generation engine device 300, and/or the computing device system 400 to perform one or more process steps described herein. In some embodiments, the entity system 200 may receive instructions from the dynamic identifier generation engine device 300 via the dynamic identifier generation engine application 250 to perform certain operations. The dynamic identifier generation engine application 250 may be provided by the dynamic identifier generation engine device 300. The one or more entity applications 270 may be any of the applications used, created, modified, facilitated, and/or managed by the entity system 200. The dynamic identifier generation engine application 250 may be in communication with the dynamic identifier generation engine device 300. In some embodiments, portions of the methods discussed herein may be carried out by the entity system 200.

FIG. 3 provides a block diagram illustrating the dynamic identifier generation engine device 300 in greater detail, in accordance with various embodiments.). As illustrated in FIG. 3, in one embodiment, the dynamic identifier generation engine device 300 includes one or more processing devices 320 operatively coupled to a network communication interface 310 and a memory device 330. In certain embodiments, the dynamic identifier generation engine device 300 is operated by an entity, such as a financial institution. In some embodiments, the dynamic identifier generation engine device 300 is owned or operated by the entity of the entity system 200. In some embodiments, the dynamic identifier generation engine device 300 may be an independent system. In alternate embodiments, the dynamic identifier generation engine device 300 may be a part of the entity system 200.

It should be understood that the memory device 330 may include one or more databases or other data structures/repositories. The memory device 330 also includes computer-executable program code that instructs the processing device 320 to operate the network communication interface 310 to perform certain communication functions of the dynamic identifier generation engine device 300 described herein. For example, in one embodiment of the dynamic identifier generation engine device 300, the memory device 330 includes, but is not limited to, a network provisioning application 340, a data gathering application 350, an artificial intelligence engine 370, a dynamic identifier generation engine executor 380, and a data repository 390 comprising any data processed or accessed by one or more applications in the memory device 330. The computer-executable program code of the network provisioning application 340, the data gathering application 350, the artificial intelligence engine 370, and the dynamic identifier generation engine executor 380 may instruct the processing device 320 to perform certain logic, data-processing, and data-storing functions of the dynamic identifier generation engine device 300 described herein, as well as communication functions of the dynamic identifier generation engine device 300.

The network provisioning application 340, the data gathering application 350, the artificial intelligence engine 370, and the dynamic identifier generation engine executor 380 are configured to invoke or use the data in the data repository 390 when communicating through the network communication interface 310 with the entity system 200, and/or the computing device system 400. In some embodiments, the network provisioning application 340, the data gathering application 350, the artificial intelligence engine 370, and the dynamic identifier generation engine executor 380 may store the data extracted or received from the entity system 200, and the computing device system 400 in the data repository 390. In some embodiments, the network provisioning application 340, the data gathering application 350, the artificial intelligence engine 370, and the dynamic identifier generation engine executor 380 may be a part of a single application.

FIG. 4 provides a block diagram illustrating a computing device system 400 of FIG. 1 in more detail, in accordance with various embodiments. However, it should be understood that a mobile telephone is merely illustrative of one type of computing device system 400 that may benefit from, employ, or otherwise be involved with embodiments of the present disclosure and, therefore, should not be taken to limit the scope of embodiments of the present disclosure. Other types of computing devices may include portable digital assistants (PDAs), pagers, mobile televisions, electronic media devices, desktop computers, workstations, laptop computers, cameras, video recorders, audio/video player, radio, GPS devices, wearable devices, Internet-of-things devices, augmented reality devices, virtual reality devices, automated teller machine (ATM) devices, electronic kiosk devices, or any combination of the aforementioned.

Some embodiments of the computing device system 400 include a processor 410 communicably coupled to such devices as a memory 420, user output devices 436, user input devices 440, a network interface 460, a power source 415, a clock or other timer 450, a camera 480, and a positioning system device 475. The processor 410, and other processors described herein, generally include circuitry for implementing communication and/or logic functions of the computing device system 400. For example, the processor 410 may include a digital signal processor device, a microprocessor device, and various analog to digital converters, digital to analog converters, and/or other support circuits. Control and signal processing functions of the computing device system 400 are allocated between these devices according to their respective capabilities. The processor 410 thus may also include the functionality to encode and interleave messages and data prior to modulation and transmission. The processor 410 can additionally include an internal data modem. Further, the processor 410 may include functionality to operate one or more software programs, which may be stored in the memory 420. For example, the processor 410 may be capable of operating a connectivity program, such as a web browser application 422. The web browser application 422 may then allow the computing device system 400 to transmit and receive web content, such as, for example, location-based content and/or other web page content, according to a Wireless Application Protocol (WAP), Hypertext Transfer Protocol (HTTP), and/or the like.

The processor 410 is configured to use the network interface 460 to communicate with one or more other devices on the network 150. In this regard, the network interface 460 includes an antenna 476 operatively coupled to a transmitter 474 and a receiver 472 (together a "transceiver"). The processor 410 is configured to provide signals to and receive signals from the transmitter 474 and receiver 472, respectively. The signals may include signaling information in accordance with the air interface standard of the applicable cellular system of the wireless network 152. In this regard, the computing device system 400 may be configured to operate with one or more air interface standards, communication protocols, modulation types, and access types. By way of illustration, the computing device system 400 may be configured to operate in accordance with any of a number of first, second, third, and/or fourth-generation communication protocols and/or the like.

As described above, the computing device system 400 has a user interface that is, like other user interfaces described herein, made up of user output devices 436 and/or user input devices 440. The user output devices 436 include one or more displays 430 (e.g., a liquid crystal display or the like) and a speaker 432 or other audio device, which are operatively coupled to the processor 410.

The user input devices 440, which allow the computing device system 400 to receive data from a user such as the user 110, may include any of a number of devices allowing the computing device system 400 to receive data from the user 110, such as a keypad, keyboard, touch-screen, touchpad, microphone, mouse, joystick, other pointer device, button, soft key, and/or other input device(s). The user interface may also include a camera 480, such as a digital camera.

The computing device system 400 may also include a positioning system device 475 that is configured to be used by a positioning system to determine a location of the computing device system 400. For example, the positioning system device 475 may include a GPS transceiver. In some embodiments, the positioning system device 475 is at least partially made up of the antenna 476, transmitter 474, and receiver 472 described above. For example, in one embodiment, triangulation of cellular signals may be used to identify the approximate or exact geographical location of the computing device system 400. In other embodiments, the positioning system device 475 includes a proximity sensor or transmitter, such as an RFID tag, that can sense or be sensed by devices known to be located proximate a merchant or other location to determine that the computing device system 400 is located proximate these known devices.

The computing device system 400 further includes a power source 415, such as a battery, for powering various circuits and other devices that are used to operate the computing device system 400. Embodiments of the computing device system 400 may also include a clock or other timer 450 configured to determine and, in some cases, communicate actual or relative time to the processor 410 or one or more other devices.

The computing device system 400 also includes a memory 420 operatively coupled to the processor 410. As used herein, memory includes any computer readable medium (as defined herein below) configured to store data, code, or other information. The memory 420 may include volatile memory, such as volatile Random Access Memory (RAM) including a cache area for the temporary storage of data. The memory 420 may also include non-volatile memory, which can be embedded and/or may be removable. The non-volatile memory can additionally or alternatively include an electrically erasable programmable read-only memory (EEPROM), flash memory or the like.

The memory 420 can store any of a number of applications which comprise computer-executable instructions/code executed by the processor 410 to implement the functions of the computing device system 400 and/or one or more of the process/method steps described herein. For example, the memory 420 may include such applications as a conventional web browser application 422, a dynamic identifier generation engine application 421, entity application 424. These applications also typically instructions to a graphical user interface (GUI) on the display 430 that allows the user 110 to interact with the entity system 200, the dynamic identifier generation engine device 300, and/or other devices or systems. The memory 420 of the computing device system 400 may comprise a Short Message Service (SMS) application 423 configured to send, receive, and store data, information, communications, alerts, and the like via the wireless telephone network 152. In some embodiments, the dynamic identifier generation engine application 421 provided by the dynamic identifier generation engine device 300 allows the user 110 to access the dynamic identifier generation engine device 300. In some embodiments, the entity application 424 provided by the entity system 200 and the dynamic identifier generation engine application 421 allow the user 110 to access the functionalities provided by the dynamic identifier generation engine device 300 and the entity system 200.

The memory 420 can also store any of a number of pieces of information, and data, used by the computing device system 400 and the applications and devices that make up the computing device system 400 or are in communication with the computing device system 400 to implement the functions of the computing device system 400 and/or the other systems described herein.

FIG. 5 illustrates another example method of generating and monitoring dynamic identifiers for data processing security. The method may be carried out by a system discussed herein (e.g., the entity system 200, the dynamic identifier generation engine device 300, and/or the computing device system 400). An example system may include at least one non-transitory storage device and at least one processing device coupled to the at least one non-transitory storage device. In such an embodiment, the at least one processing device is configured to carry out the method discussed herein.

The operations discussed herein may be carried out using blockchain technology. For example, the system may be, use, or otherwise be associated with a distributed ledger or distributed ledger technology (DLT). As such, each node discussed herein may be a computing device which hosts the distributed ledger. Each node may be associated with a different entity, such that the given nodes can alter and/or update the distributed ledger. The operations discussed herein can be carried out across extended networks of nodes. For example, the dynamic identifier can be generated and/or monitored even when the dynamic identifier is transmitted to a node on a different network.

Referring now to Block 500 of FIG. 5, the method includes generating a dynamic identifier for a user request in an instance in which a user initiates the user request. The dynamic identifier can be used to verify the data being transmitted and/or requested between nodes. The dynamic identifier may be generated by the dynamic identifier generation engine device 300. The dynamic identifier may be a hash dubcode generated for identifying one or more nodes that receive or transmit the user request. The dynamic identifier can be used to identify a user request, verify a transmitting node, and/or the like. The dynamic identifier can be used to reference user information that is stored either on the receiving node or another node.

During execution of a user request, the user request, along with the dynamic identifier may be transmitted to a plurality of nodes. For example, a first node (e.g., associated with a first entity) may facilitate a portion of the user request (e.g., providing user payment information) and a second node (e.g., associated with a second entity) may facilitate a different portion of the user request (e.g., receiving the user payment information). As such, the dynamic identifier may be updated at each jump (e.g., each time the dynamic identifier is transmitted from one node to another node).

Referring now to Block 510 of FIG. 5, the method includes updating the dynamic identifier in an instance in which the user request is transmitted from a first node to a second node. Each node (e.g., the first node, the second node, etc.) may be in communication with the dynamic identifier generation engine 300. The dynamic identifier generation engine 300 may be configured to generate the dynamic identifier and then subsequently update the dynamic identifier. As discussed herein, the generation and updating of the dynamic identifier may also be carried out at least in part by the entity device 200 and/or the computing device 400.

After generation, the dynamic identifier may be updated each time the dynamic identifier is transmitted to a different node. For example, each node may be in communication with the dynamic identifier generation engine 300. Upon receiving a dynamic identifier, a given node is configured to transmit the dynamic identifier to the dynamic identifier generation engine 300, which verifies the received dynamic identifier and then transmits the updated dynamic identifier back to the given node, at which time the given node transmits the updated dynamic identifier along to the next node. As such, the dynamic identifier generation engine 300 is configured to verify the dynamic identifier received at each node and update said dynamic identifier for subsequent transmission. As such, the dynamic identifier can be updated a plurality of times by the dynamic identifier generation engine 300 for each transmission from one node to another.

Referring now to Block 520 of FIG. 5, the method includes generate a dynamic identifier change log. The dynamic identifier change log may already be generated and stored in the dynamic identifier generation engine 300, for example. The dynamic identifier change log is either created and/or updated to indicate any changes to the dynamic identifier. As such, each time the dynamic identifier is updated (e.g., when the dynamic identifier is transmitted to another node), the dynamic identifier change log is updated to reflect the updates. The dynamic identifier change log includes at least one historical dynamic identifier from a previous receiving node (e.g., a previous dynamic identifier before being updated one or more times). The dynamic identifier change log may be stored on the dynamic identifier generation engine 300. The dynamic identifier change log may be stored on a blockchain, such that the dynamic identifier generation engine 300 can reference the given blockchain in the comparison discussed in reference to Block 530 below.

The system has a centralized dynamic identifier generator and updater (e.g., the dynamic identifier generation engine 300) and hence is capable of creating a dynamic identifier timeline. The dynamic identifier timeline includes any updates made to the dynamic identifier after generation. For example, the dynamic identifier timeline may include the value of the dynamic identifier before being updated and/or the node at which the dynamic identifier was updated.

The dynamic identifier change logs may be used as expected dynamic identifier change logs for subsequent verification of a dynamic identifier. For example, a dynamic identifier change log may be generated or updated in an instance in which a dynamic identifier updated and sent to a first node. When the dynamic identifier is then transmitted to a second node, the existing dynamic identifier change log can be compared to information relating to the dynamic identifier received by the second node to determine if the dynamic identifier is legitimate.

Referring now to Block 530 of FIG. 5, the method includes determining whether the dynamic identifier change log matches an expected dynamic identifier change log. As discussed above, the expected dynamic identifier change log may be based on previous updates to the dynamic identifier (e.g., by the dynamic identifier generation engine 300).

In some embodiments, determining whether the dynamic identifier change log matches the expected dynamic identifier change log includes determining whether a dynamic identifier timeline of the dynamic identifier change log matches an expected dynamic identifier timeline of the expected dynamic identifier change log. As discussed above, the system may trace the dynamic identifier received by a given node and determine whether the dynamic identifier is legitimate. Using this tracing, the system is capable of verifying the dynamic identifier timeline, which increases the likelihood that the dynamic identifier is legitimate.

In some embodiments, determining whether the dynamic identifier change log matches the expected dynamic identifier change log includes determining whether at least one of the dynamic identifier or at least one of the at least one historical dynamic identifier matches an expected dynamic identifier. For example, the system may compare the dynamic identifier with a dynamic identifier provided to the previous node. The expected dynamic identifier may be based on known dynamic identifier values (e.g., previous dynamic identifier values). Additionally or alternatively, the expected dynamic identifier may be derived other methods. For example, the expected dynamic identifier may be determined based on the identity of one or more nodes.

Referring now to Block 540 of FIG. 5, the method includes causing a transmission of a dynamic identifier verification upon determining that the dynamic identifier change log matches the expected dynamic identifier change log. The dynamic identifier verification may be the updated dynamic identifier for further transmission (e.g., as shown in FIG. 6, the dubcode is updated and provided to the given node upon verification). Additionally, the dynamic identifier verification may be a message or other notification that the dynamic identifier is authenticate (e.g., the dynamic identifier generation engine 300 may transmit a confirmation that the dynamic identifier is legitimate. The approval of the dynamic identifier may be used by various nodes to facilitate a transaction.

In an instance in which the dynamic identifier change log does not match the expected dynamic identifier change log, an error notification may be transmitted to the given node. Additionally, the dynamitic identifier and/or related information may be erased or otherwise marked to indicate that the dynamic identifier is not trustworthy.

Referring to FIG. 6, a flow chart model of a dynamic identifier being transferred and updated across a plurality of nodes is provided in accordance with embodiments of the present disclosure. The example of FIG. 6 is a transaction. As such, the user 110 may have a computing device 400 (e.g., a mobile device). The user provides a user request (e.g., a request to make a purchase) via the computing device 400. To begin the process, the computing device requests a dynamic identifier (e.g., request dubcode 601) from node 0 600. Node 0 may be a node associated with a financial institution associated with the user (e.g., a bank in which the user has an account). Upon receiving the request from the computing device 400, node 0 600 requests the dynamic identifier from a dynamic identifier generation engine 300 (e.g., request dubcode 602). The dynamic identifier may then generate the dynamic identifier and transmit said dynamic identifier to node 0 600 (e.g., send dubcode 1 603). Node 0 600 then transmits the dynamic identifier to the computing device (e.g., step 604) in order for the user to begin the user request.

Upon receiving the dynamic identifier, the computing device 400 can then initiate the user request (e.g., the transaction). by providing the dynamic identifier to Node 1 (e.g., a merchant) at step 605. Node 1 may also be in communication with the dynamic identifier generation engine 300. A such, Node 1 may transmit the dynamic identifier to the dynamic identifier generation engine 300 for verification. The dynamic identifier generation engine 300 may verify the dynamic identifier as discussed herein.

Node 1 may then transmit the dynamic identifier to node 2 625 in step 606. Node 2 may be an acquiring bank that processes payments on behalf of merchants. Node 2 625 may also be in communication with the dynamic identifier generation engine 300. As such, Node 2 625 may transmit the dynamic identifier to the dynamic identifier generation engine 300 for verification as shown in step 607. The dynamic identifier generation engine 300 may verify the dynamic identifier using operations discussed herein (e.g., the operations discussed in reference to FIG. 5). Additionally, the dynamic identifier generation engine 300 may update the dynamic identifier and transmit the updated dynamic identifier (e.g., dubcode 2) to Node 2, as shown in step 608.

Node 2 may then transmit the updated dynamic identifier (e.g., dubcode 2) to Node 3 630 in step 609. An example Node 3 630 is a payment bank. Similar to Node 2 discussed above, Node 3 630 may be in communication with the dynamic identifier generation engine 300. As such, Node 3 630 may transmit the dynamic identifier (e.g., dubcode 2) to the dynamic identifier generation engine 300 for verification as shown in step 610. The dynamic identifier generation engine 300 may verify the dynamic identifier using operations discussed herein (e.g., the operations discussed in reference to FIG. 5). Additionally, the dynamic identifier generation engine 300 may update the dynamic identifier and transmit the updated dynamic identifier (e.g., dubcode 3) to Node 3, as shown in step 611.

Node 3 may then transmit the updated dynamic identifier (e.g., dubcode 3) to Node 3 600 in step 612. Node 0 may again transmit the dynamic identifier to the dynamic identifier generation engine 300 to verify the dynamic identifier. Using the capabilities discussed herein, the dynamic identifier generation engine 300 is capable of verifying each step of the user request and verify that the dynamic identifier is correct. For example, the dynamic identifier may match an expected dynamic identifier that had been transmitted from Node 1 620 to Node 2 625 to Node 3 630 and then to Node 0 600. Upon verification of the dynamic identifier to Node 0, Node 0 600 may then approve a transfer of funds based on the user request. For example, the bank of the user may approve the purchase (e.g., provides funds to cover said purchase from account of user). While the example shown in FIG. 6 includes 4 nodes, any number of nodes may be present in various embodiments, based on the complexity of the user request (e.g., there may be more nodes that are required to facilitate the user request).

As will be appreciated by one of skill in the art, the present disclosure may be embodied as a method (including, for example, a computer-implemented process, a business process, and/or any other process), apparatus (including, for example, a system, machine, device, computer program product, and/or the like), or a combination of the foregoing. Accordingly, embodiments of the present disclosure may take the form of an entirely hardware embodiment, an entirely software embodiment (including firmware, resident software, micro-code, and the like), or an embodiment combining software and hardware aspects that may generally be referred to herein as a "system." Furthermore, embodiments of the present disclosure may take the form of a computer program product on a computer-readable medium having computer-executable program code embodied in the medium.

Any suitable transitory or non-transitory computer readable medium may be utilized. The computer readable medium may be, for example but not limited to, an electronic, magnetic, optical, electromagnetic, infrared, or semiconductor system, apparatus, or device. More specific examples of the computer readable medium include, but are not limited to, the following: an electrical connection having one or more wires; a tangible storage medium such as a portable computer diskette, a hard disk, a random access memory (RAM), a read-only memory (ROM), an erasable programmable read-only memory (EPROM or Flash memory), a compact disc read-only memory (CD-ROM), or other optical or magnetic storage device.

In the context of this document, a computer readable medium may be any medium that can contain, store, communicate, or transport the program for use by or in connection with the instruction execution system, apparatus, or device. The computer usable program code may be transmitted using any appropriate medium, including but not limited to the Internet, wireline, optical fiber cable, radio frequency (RF) signals, or other mediums.

Computer-executable program code for carrying out operations of embodiments of the present disclosure may be written in an object oriented, scripted or unscripted programming language such as Java, Perl, Smalltalk, C++, or the like. However, the computer program code for carrying out operations of embodiments of the present disclosure may also be written in conventional procedural programming languages, such as the "C" programming language or similar programming languages.

Embodiments of the present disclosure are described above with reference to flowchart illustrations and/or block diagrams of methods, apparatus (systems), and computer program products. It will be understood that each block of the flowchart illustrations and/or block diagrams, and/or combinations of blocks in the flowchart illustrations and/or block diagrams, can be implemented by computer-executable program code portions. These computer-executable program code portions may be provided to a processor of a general purpose computer, special purpose computer, or other programmable data processing apparatus to produce a particular machine, such that the code portions, which execute via the processor of the computer or other programmable data processing apparatus, create mechanisms for implementing the functions/acts specified in the flowchart and/or block diagram block or blocks.

These computer-executable program code portions may also be stored in a computer-readable memory that can direct a computer or other programmable data processing apparatus to function in a particular manner, such that the code portions stored in the computer readable memory produce an article of manufacture including instruction mechanisms which implement the function/act specified in the flowchart and/or block diagram block(s).

The computer-executable program code may also be loaded onto a computer or other programmable data processing apparatus to cause a series of operational steps to be performed on the computer or other programmable apparatus to produce a computer-implemented process such that the code portions which execute on the computer or other programmable apparatus provide steps for implementing the functions/acts specified in the flowchart and/or block diagram block(s). Alternatively, computer program implemented steps or acts may be combined with operator or human implemented steps or acts in order to carry out an embodiment of the disclosure.

As the phrase is used herein, a processor may be "configured to" perform a certain function in a variety of ways, including, for example, by having one or more general-purpose circuits perform the function by executing particular computer-executable program code embodied in computer-readable medium, and/or by having one or more application-specific circuits perform the function.

Embodiments of the present disclosure are described above with reference to flowcharts and/or block diagrams. It will be understood that steps of the processes described herein may be performed in orders different than those illustrated in the flowcharts. In other words, the processes represented by the blocks of a flowchart may, in some embodiments, be in performed in an order other that the order illustrated, may be combined or divided, or may be performed simultaneously. It will also be understood that the blocks of the block diagrams illustrated, in some embodiments, merely conceptual delineations between systems and one or more of the systems illustrated by a block in the block diagrams may be combined or share hardware and/or software with another one or more of the systems illustrated by a block in the block diagrams. Likewise, a device, system, apparatus, and/or the like may be made up of one or more devices, systems, apparatuses, and/or the like. For example, where a processor is illustrated or described herein, the processor may be made up of a plurality of microprocessors or other processing devices which may or may not be coupled to one another. Likewise, where a memory is illustrated or described herein, the memory may be made up of a plurality of memory devices which may or may not be coupled to one another.

While certain exemplary embodiments have been described and shown in the accompanying drawings, it is to be understood that such embodiments are merely illustrative of, and not restrictive on, the broad disclosure, and that this disclosure not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the disclosure. Therefore, it is to be understood that, within the scope of the appended claims, the disclosure may be practiced other than as specifically described herein.

What is claimed is:

1. A system for generating and monitoring a dynamic identifier for data processing security, the system comprising:
    at least one non-transitory storage device; and
    at least one processing device coupled to the at least one non-transitory storage device, wherein the at least one processing device is configured to:
    generate a dynamic identifier for a user request in an instance in which a user initiates the user request, wherein the user request is configured to be transmitted to a plurality of nodes, wherein the dynamic identifier changes based on a receiving node of the dynamic identifier;
    update the dynamic identifier in an instance in which the user request is transmitted from a first node to a second node;
    generate a dynamic identifier change log, wherein the dynamic identifier change log includes at least one historical dynamic identifier from a previous receiving node;
    determine whether the dynamic identifier change log matches an expected dynamic identifier change log; and
    cause a transmission of a dynamic identifier verification upon determining that the dynamic identifier change log matches the expected dynamic identifier change log.

2. The system of claim 1, wherein the dynamic identifier is a hash dubcode generated for identifying one or more nodes that receive or transmit the user request.

3. The system of claim 1, wherein determining whether the dynamic identifier change log matches the expected dynamic identifier change log comprises determining whether a dynamic identifier timeline of the dynamic identifier change log matches an expected dynamic identifier timeline of the expected dynamic identifier change log.

4. The system of claim 1, wherein determining whether the dynamic identifier change log matches the expected dynamic identifier change log comprises determining whether at least one of the dynamic identifier or at least one of the at least one historical dynamic identifier matches an expected dynamic identifier.

5. The system of claim 1, wherein the dynamic identifier is used to reference user information that is stored with the receiving node.

6. The system of claim 1, wherein each of the first node and the second node are in communication with a dynamic identifier generation engine configured to generate the dynamic identifier and update the dynamic identifier.

7. The system of claim 1, wherein the dynamic identifier is updated a plurality of times before the user request is approved or rejected.

8. A computer program product for generating and monitoring a dynamic identifier for data processing security, the computer program product comprising at least one non-transitory computer-readable medium having computer-readable program code portions embodied therein, the computer-readable program code portions comprising:
    an executable portion configured to generate a dynamic identifier for a user request in an instance in which a user initiates the user request, wherein the user request is configured to be transmitted to a plurality of nodes, wherein the dynamic identifier changes based on a receiving node of the dynamic identifier;
    an executable portion configured to update the dynamic identifier in an instance in which the user request is transmitted from a first node to a second node;
    an executable portion configured to generate a dynamic identifier change log, wherein the dynamic identifier change log includes at least one historical dynamic identifier from a previous receiving node;
    an executable portion configured to determine whether the dynamic identifier change log matches an expected dynamic identifier change log; and
    an executable portion configured to cause a transmission of a dynamic identifier verification upon determining that the dynamic identifier change log matches the expected dynamic identifier change log.

9. The computer program product of claim 8, wherein the dynamic identifier is a hash dubcode generated for identifying one or more nodes that receive or transmit the user request.

10. The computer program product of claim 8, wherein determining whether the dynamic identifier change log matches the expected dynamic identifier change log comprises determining whether a dynamic identifier timeline of the dynamic identifier change log matches an expected dynamic identifier timeline of the expected dynamic identifier change log.

11. The computer program product of claim 8, wherein determining whether the dynamic identifier change log matches the expected dynamic identifier change log comprises determining whether at least one of the dynamic identifier or at least one of the at least one historical dynamic identifier matches an expected dynamic identifier.

12. The computer program product of claim 8, wherein the dynamic identifier is used to reference user information that is stored with the receiving node.

13. The computer program product of claim 8, wherein each of the first node and the second node are in communication with a dynamic identifier generation engine configured to generate the dynamic identifier and update the dynamic identifier.

14. The computer program product of claim 8, wherein the dynamic identifier is updated a plurality of times before the user request is approved or rejected.

15. A computer-implemented method for generating and monitoring a dynamic identifier for data processing security, the method comprising:
    generating a dynamic identifier for a user request in an instance in which a user initiates the user request, wherein the user request is configured to be transmitted to a plurality of nodes, wherein the dynamic identifier changes based on a receiving node of the dynamic identifier;
    updating the dynamic identifier in an instance in which the user request is transmitted from a first node to a second node;
    generating a dynamic identifier change log, wherein the dynamic identifier change log includes at least one historical dynamic identifier from a previous receiving node;
    determining whether the dynamic identifier change log matches an expected dynamic identifier change log; and
    causing a transmission of a dynamic identifier verification upon determining that the dynamic identifier change log matches the expected dynamic identifier change log.

16. The method of claim 15, wherein the dynamic identifier is a hash dubcode generated for identifying one or more nodes that receive or transmit the user request.

17. The method of claim 15, wherein determining whether the dynamic identifier change log matches the expected dynamic identifier change log comprises determining whether a dynamic identifier timeline of the dynamic identifier change log matches an expected dynamic identifier timeline of the expected dynamic identifier change log.

18. The method of claim 15, wherein determining whether the dynamic identifier change log matches the expected dynamic identifier change log comprises determining whether at least one of the dynamic identifier or at least one of the at least one historical dynamic identifier matches an expected dynamic identifier.

19. The method of claim 15, wherein the dynamic identifier is used to reference user information that is stored with the receiving node.

20. The method of claim 15, wherein each of the first node and the second node are in communication with a dynamic identifier generation engine configured to generate the dynamic identifier and update the dynamic identifier.

* * * * *